United States Patent [19]

Patil

[11] 4,224,927
[45] Sep. 30, 1980

[54] SOLAR COLLECTOR FOR HEATING A FLUID

[75] Inventor: Pandit G. Patil, Pittsburgh, Pa.

[73] Assignee: PPG Industries, Inc., Pittsburgh, Pa.

[21] Appl. No.: 938,206

[22] Filed: Aug. 30, 1978

Related U.S. Application Data

[60] Division of Ser. No. 700,257, Jun. 28, 1976, which is a continuation-in-part of Ser. No. 672,098, Mar. 31, 1976, which is a continuation-in-part of Ser. No. 573,497, May 1, 1975, abandoned.

[51] Int. Cl.³ .............................................. F24J 3/02
[52] U.S. Cl. .................................... 126/449; 126/450
[58] Field of Search .............. 126/270, 271, 449, 448, 126/432, 450; 237/1 A; 165/170–175; 52/172

[56] References Cited

U.S. PATENT DOCUMENTS

| 201,439 | 3/1878 | Moreau | 126/270 |
|---|---|---|---|
| 679,451 | 7/1901 | Baker | 126/271 |
| 2,490,659 | 12/1949 | Snyder | 126/271 |
| 2,601,905 | 7/1952 | Anderegg | 126/270 |
| 2,680,437 | 6/1954 | Miller | 126/270 |
| 3,145,707 | 8/1964 | Thomason | 126/271 |
| 3,771,276 | 11/1973 | Stewart | 126/270 |
| 3,919,998 | 11/1975 | Parker | 126/270 |
| 3,957,109 | 5/1976 | Worthington | 126/270 |
| 3,960,135 | 6/1976 | Angilletta | 126/270 |
| 3,974,822 | 8/1976 | Patil | 126/271 |
| 3,981,293 | 9/1976 | Gillery | 126/271 |
| 3,986,491 | 10/1976 | O'Hanlon | 126/271 |
| 3,989,031 | 11/1976 | Thomason | 126/271 |
| 3,990,635 | 11/1976 | Restle et al. | 126/270 |
| 3,994,276 | 11/1976 | Pulver | 126/270 |
| 3,995,613 | 12/1976 | Patil | 126/271 |
| 4,036,209 | 7/1977 | Press | 126/271 |

FOREIGN PATENT DOCUMENTS

| 276788 | 11/1965 | Australia | 126/270 |
|---|---|---|---|
| 2120345 | 11/1972 | Fed. Rep. of Germany | 126/270 |
| 645802 | 9/1962 | Italy | 165/170 |

*Primary Examiner*—James C. Yeung
*Attorney, Agent, or Firm*—Donald Carl Lepiane

[57] ABSTRACT

A solar collector for heating a fluid, e.g., air or water, is provided with at least one glass plate and an infrared reflector plate mounted about a solar and infrared energy absorber to provide fluid heating compartments. Facilities are provided for moving the fluid through the heating compartments to efficiently utilize the solar and infrared energy to heat the fluid.

Other embodiments of solar collectors are taught for efficiently heating the fluid by increasing the fluid path to optimize the use of solar and infrared energy.

9 Claims, 18 Drawing Figures

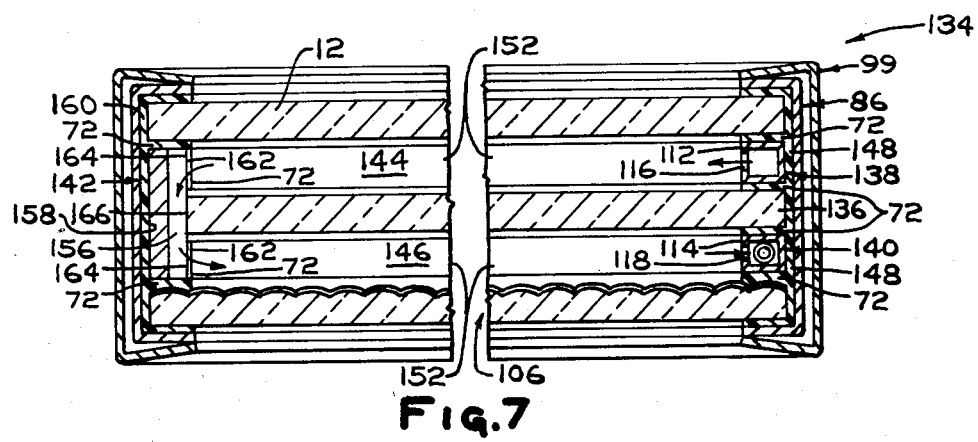
FIG.7
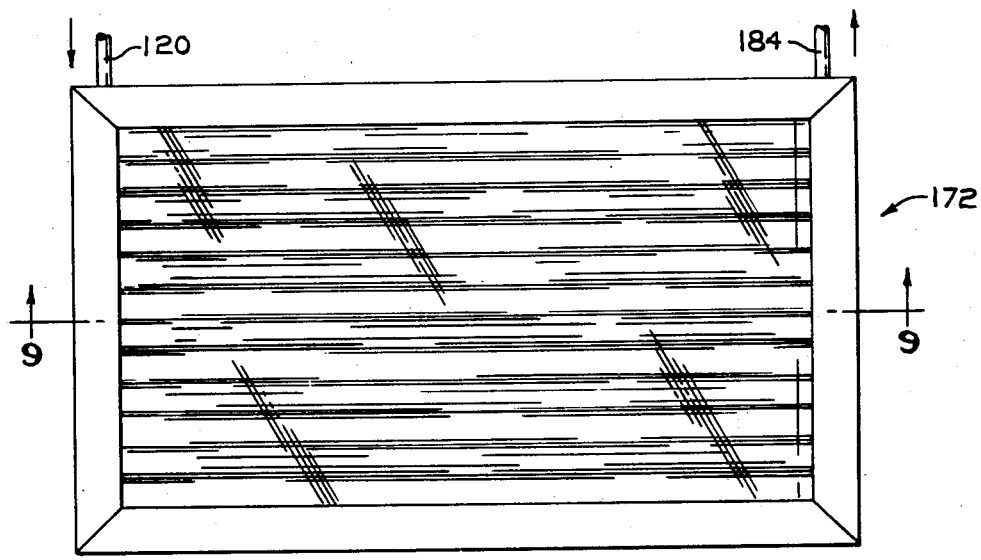
FIG.8
FIG.9
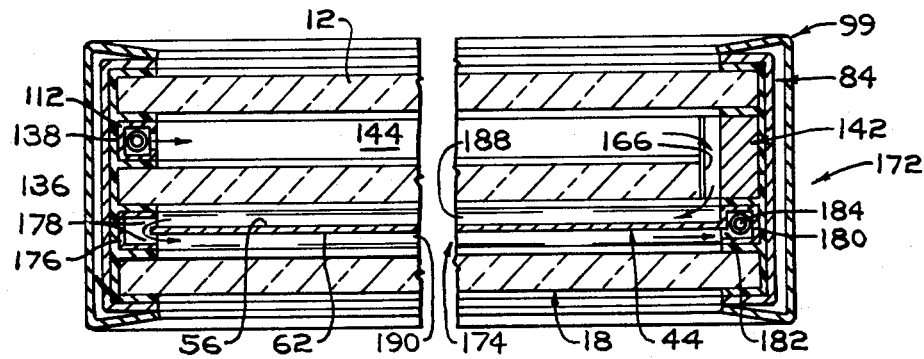

SOLAR COLLECTOR FOR HEATING A FLUID

RELATED U.S. PATENT APPLICATION

This is a division of U.S. patent application Ser. No. 700,257, filed on June 28, 1976, in the name of Pandit G. Patil for "Solar Collector For Heating A Fluid" which, is a continuation-in-part of U.S. patent application Ser. No. 672,098 filed on Mar. 31, 1976 in the name of Pandit G. Patil for "Solar Air Heaters" which is a continuation-in-part of U.S. patent application Ser. No. 573,497 filed on May 1, 1975, now abandoned, in the name of Pandit G. Patil for "Solar Air Heaters."

BACKGROUND OF THE INVENTION

1. Field of the Invention

The invention relates to solar collector for heating a fluid, e.g, water or air.

2. Discussion of the Prior Art

The use of solar collectors for heating fluids, e.g., water or air has been recognized in the prior art.

In U.S. Pat. No. 3,102,532 there is taught a solar collector including an outside and an inside glass sheet separated by a dead airspace. The inside glass sheet is separated from a bottom plate to provide a collector chamber that contains stacked sheets of perforated foil having their surface facing the sun painted black and the opposite surface provided with a reflective surface. Air is moved through the stacked sheets and heated by solar and infrared energy.

Although the solar collector taught in U.S. Pat. No. 3,012,532 is suitable for heating air, it has drawbacks. For example, providing stacked sheets of perforated foil is expensive. This is because each of the sheets has to be perforated and selectively coated. Another drawback is that not all the coated surfaces of the sheets are exposed to solar energy. This is because the upper sheets act as a barrier for solar radiation to the lower sheets. Therefore it can be assumed that the bottommost sheet of the stack is cooler than the topmost sheet. With this condition, there is a temperature gradient in the air flow which can result in the heated air having air masses of different temperatures instead of uniformly heated air.

U.S. Pat. Nos. 2,601,905 and 3,412,728 each teach a solar heating system which provides for the introduction of fresh air. In general, U.S. Pat. No. 3,412,728 teaches a solar collector having an outer transparent covering and a heat collector sheet, e.g., a corrugated metal sheet treated on its outer surface to absorb sunrays and convert them to infrared heat. An inner insulation member, e.g., glass fiber, or reflective insulation, is provided in spaced relation to the absorber. The transparent covering is provided with passages to admit warm air from outside to inside the collector.

The collector of U.S. Pat. No. 3,412,728 has limitations because the solar collector is not a closed system. More particularly, when fresh warm air enters the collector, there are conduction and/or convection heat losses which reduce the efficiency of the solar heat collector.

It would be advantageous therefore to provide a solar air heater that does not have the drawbacks of the prior art.

SUMMARY OF THE INVENTION

This invention relates to a solar heater for heating a fluid, e.g., air, which includes a cover plate capable of passing solar energy, e.g., a tempered, transparent glass sheet and an infrared reflector plate, e.g., a glass plate having a coating of tin oxide or indium oxide, mounted about a solar energy and infrared absorber plate to provide two discrete heating compartments. Facilities are provided for mounting the glass sheet and infrared reflector plate to the absorber to prevent uncontrolled ambient air from moving into the heating compartments. Facilities are further provided for passing air through the heating compartments to heat the air by (1) solar and infrared energy, and (2) by convection. In one embodiment, the absorber is provided with a first series of holes or slots to move the air in a first direction and a second series of holes to move the air in a second direction opposite to the first direction. In this manner, air turbulance is created to efficiently heat the air by solar energy.

This invention also relates to a solar gas heater having the cover plate mounted in spaced relation to a solar energy absorber having a patterned surface to increase the surface area for absorbing solar and infrared energy. The absorber is provided with a selective coating to efficiently absorb solar and infrared energy. The coating may be (1) a black paint; (2) a black paint over a reflective coating, e.g., tin oxide or indium oxide or (3) a reflective coating over a black paint.

Further, this invention relates to a solar gas heater including a first and second cover plate each capable of passing solar energy mounted in spaced relation to each other to provide a first heating compartment. An absorber is mounted in spaced relation to the second cover plate to provide a second heating compartment. Facilities are provided for passing air from the first heating compartment to the second heating compartment to provide an increased air path to effectively heat the gas by solar and infrared energy.

Still further this invention relates to a solar collector for heating a fluid, e.g., water. The collector includes a solar energy and infrared absorber mounted in spaced relation to a cover plate capable of passing solar energy to provide a sealed compartment therebetween. The absorber has a plurality of channels formed in its surface between a pair of opposed sides. Facilities are provided for directing water into each channel and for passing the water out of the compartment.

In one embodiment the absorber includes the absorber plate and infrared reflector plate to provide a third heating compartment connected to the second heating compartment to provide a still longer air path.

This invention also relates to a solar energy and infrared absorber including a substrate, e.g., a glass plate, having a patterned surface. In one embodiment, a black coating is provided on the patterned surface followed by an infrared reflective coating, e.g., indium oxide or tin oxide. In another embodiment, the reflective coating is provided on the surface followed by the black coating.

DESCRIPTION OF THE DRAWING

FIG. 7 is a fragmented view taken along lines 7—7 of FIG. 6;

FIG. 8 is a plan view of an alternate embodiment of a solar collector having portions removed for purposes of clarity and incorporating features of the invention;

FIG. 9 is a fragmented view taken along lines 9—9 of FIG. 8;

DESCRIPTION OF THE INVENTION

This invention relates to solar collectors for efficiently heating a fluid, e.g., water or air. In the following discussion, like numerals refer to like elements.

Figure 1:
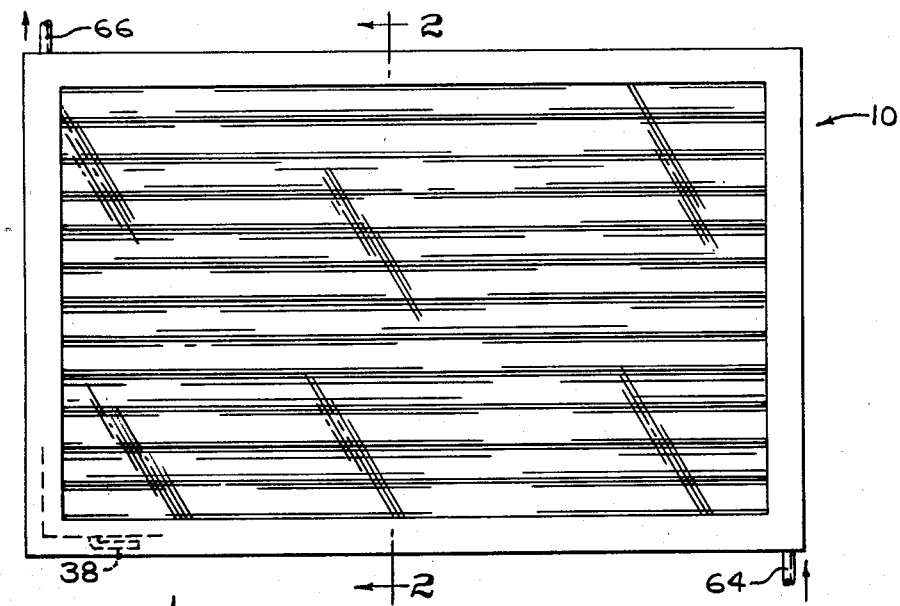
FIG. 1 is a plan view of a solar collector incorporating features of the invention.
Figure 2:
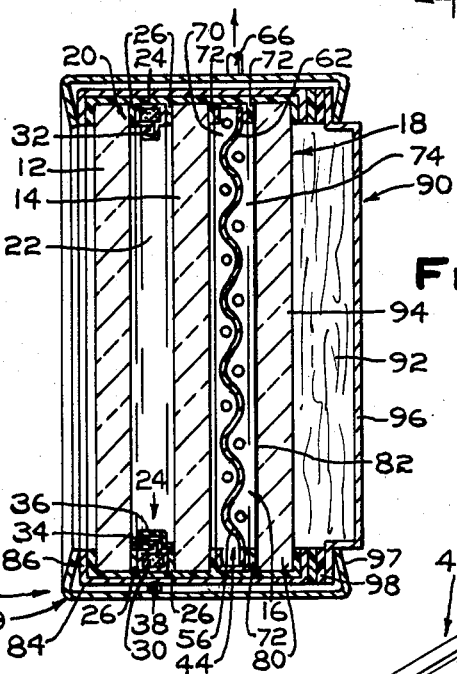
FIG. 2 is a view taken along lines 2—2 of FIG. 1.

Referring to FIGS. 1 and 2, there is shown a solar collector 10 incorporating features of the invention for heating a fluid. In the following discussion the fluid heated by solar energy is preferably air, however as will be appreciated, the invention is not limited thereto and may be used to heat water. With specific reference to FIG. 2, the solar collector 10 includes an outer cover plate 12, an intermediate cover plate 14, an absorber 16 (shown better in FIG. 3) incorporating features of the invention and an infrared reflector plate 18 also incorporating features of the invention.

The intermediate and outer cover plates 14 and 16, respectively, are selected to pass solar radiation to the absorber 16 while reducing heat loss from the absorber due to convection and/or conduction. Normally, the cover plates are made of glass that may be thermally or chemically tempered. Further, one or more of the cover plates may be selectively coated as taught in U.S. application Ser. No. 450,702 filed on Mar. 13, 1974, now U.S. Pat. No. 3,981,293 in the name of Frank H. Gillery and entitled "Solar Heat Collector." As can be appreciated, the invention is not limited to the number of cover plates used.

A spacer assembly 20 maintains the cover plates 12 and 14 in spaced relation to provide a dead airspace 22 therebetween. The spacer assembly 20, in general, includes a spacer frame 24 having an adhesive 26 on opposed outer surfaces to maintain the cover plates 12 and 14 about the spacer frame 24.

The spacer frame 24 is not limiting to the invention and may be of the type known in the art, e.g., taught in U.S. patent application Ser. No. 550,680 filed on Feb. 18, 1975, now U.S. Pat. No. 3,990,429 in the names of Renato J. Mazzoni and Lester F. Schutrum and entitled "Solar Heat Collector Having A Breather Tube;" in U.S. patent application Ser. No. 450,703 filed on Mar. 13, 1974, now U.S. Pat. No. 3,974,822 in the name of Pandit G. Patil and entitled "Solar Heat Collector;" or in U.S. patent application Ser. No. 550,681 filed on Feb. 18, 1975 now U.S. Pat. No. 3,995,613 in the name of Pandit G. Patil and entitled "Solar Heat Collector Having Minimum Edge Heat Loss." The teachings of the above-identified applications are hereby incorporated by reference.

The spacer frame 24 used in the instant invention is of the type disclosed in the above-mentioned U.S. patent application Ser. No. 550,680 filed Feb. 18, 1975 now U.S. Pat. No. 3,995,613.

In general, the spacer frame 24 includes sections of lock seam spacers such as the type taught in U.S. Pat. No. 2,684,266 joined at their ends and having a desiccant material 30 therein such as silica gel or molecular sieve. Communication is provided between the dead airspace 22 and the desiccant material 30 by way of passageways 32 provided in a continuous section of the spacer frame to absorb moisture in the dead airspace 22. The passageways 34 of the remaining section of the spacer frame are sealed in any conventional manner as by a layer of paint 36. A capillary tube 38 is mounted on the outer peripheral surface of the spacer frame 24 spaced from the open passageways 32. In this manner, moisture free air can be moved into and out of the dead airspace 22 to equalize the air pressure in the airspace 22 to ambient air pressure as is taught in the above-identified application.

The adhesive 26 preferably is a moisture-impervious adhesive to provide a primary moisture-impervious seal. "Moisture-impervious adhesive" as the term is used herein is adhesive that prevents moisture from moving into the dead airspace 22 while adhesively bonding the spacer frame to the cover plates. The moisture-impervious adhesive used may be any of the types known in the solar heat collector art. For example, the adhesive may be of the type disclosed in the above-mentioned U.S. Pat. No. 3,974,822 or of the type disclosed in U.S. patent application Ser. No. 550,679 filed on Feb. 18, 1975, now abandoned and refiled as U.S. patent application Ser. No. 758,876 on Jan. 12, 1977 in the names of George H. Bowser, Renato J. Mazzoni and Lester F. Schutrum and entitled "Method Of Fabricating A Solar Heat Collector." In the alternative, the cover plates 12 and 14 may be adhered to the spacer frame 24 using a glass frit and metal solder to form a hermetic glass to metal seal. The solder may be flowed by the application of thermal energy or ultrasonic vibrations.

Figure 3:
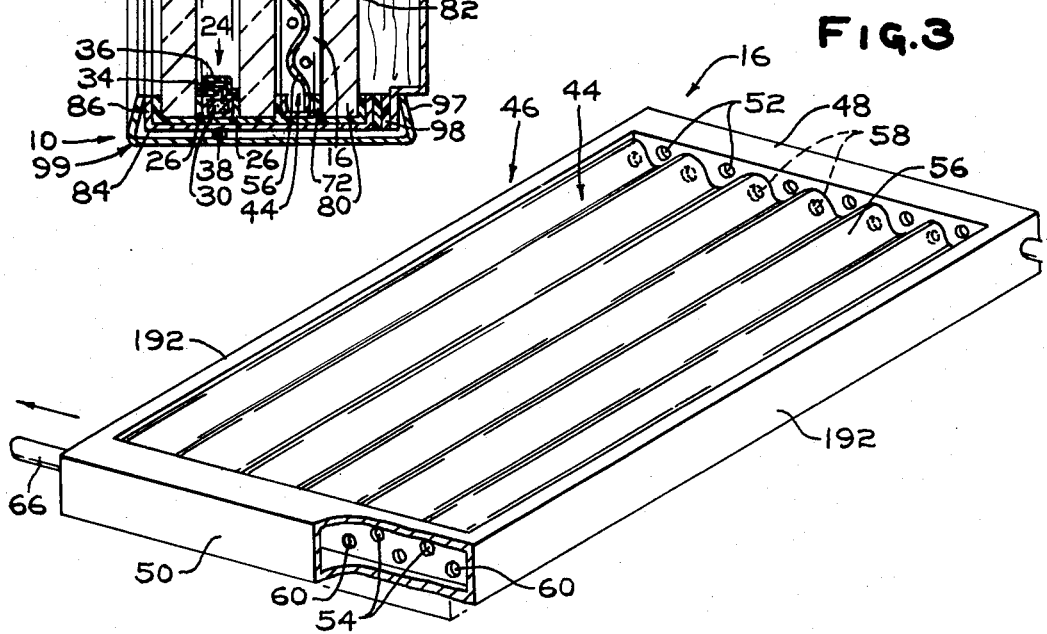
FIG. 3 is a perspective view of a solar absorber having portions removed for purposes of clarity used in the solar collector of FIG. 1 and incorporating features of the invention.

Referring now to FIGS. 2 and 3, the absorber 16 includes an infrared and solar energy absorber plate 44 supported within a frame 46. Opposed side baffles 48 and 50 of the frame 46 are each provided with a first series of holes 52 and 54, respectively, for passing air across the upper surface 56 of the absorber plate and a second series of holes 58 and 60, respectively, for moving the air across the bottom surface 62 of the absorber plate 44. For example, air is moved through inlet pipe 64 out of holes 52 and 58 of the side baffle 48 across the upper and lower surfaces of the absorber plate 44 into holes 54 and 60 of the side baffle 50 and out of the side baffle 50 by way of outlet pipe 66.

It is recommended that the sizes of the holes increase as the distance from the adjacent pipes 64 or 66 increases to provide uniform flow across the surface of the absorber plate. As can be appreciated the inlet and outlet pipe may be positioned at a convenient position on their respective baffle member.

For a given insolation increasing the air flow decreases the outcoming air temperature. Normally, an air flow of about 1 SCFM (standard cubic feet per minuete)–1.5 SCFM per square foot of absorber (0.72–1.07 cubic centimeters per minute per square centimeter of absorber) is recommended.

The absorber plate 44 generally includes a substrate made of a rigid material, e.g., steel, copper, aluminum or glass having its surfaces treated to provide maximum efficiency in absorbing solar and infrared radiation. Although not limiting to the invention, the substrate may be corrugated to provide maximum surface area to absorb solar and infrared energy.

Referring now to FIG. 2, air is confined to move over the upper surface of the absorber plate, e.g., compartment 70 by adhering the absorber frame 46 to the marginal edge portions of the intermediate cover plate 14 using an adhesive 72. The air is confined to move over the surface 62 of the absorber plate, e.g., compartment 74 by adhering the reflector plate 18 to the opposed sides of the frame using the adhesive 72. The adhesive 72 may be similar to the adhesive 26 or any type of adhesive that joins two members together, e.g., glass and metal while preventing movement of ambient air into the compartments. A moisture-impervious adhesive is not required because compartments 72 and 74 are not dead airspaces.

The infrared reflector plate 18 incorporating features of the invention, in general, include a rigid member 80, e.g., glass, wood, plastic, ceramics, or metal having an infrared reflective coating 82 such as indium oxide, tin oxide, silver, gold or a mixture thereof to name a few. Preferably the member 80 is a glass sheet coated with indium oxide or tin oxide applied in a manner taught in U.S. Pat. Nos. 2,566,346; 3,107,177; 3,677,814; 3,447,936; 3,506,577; and 3,655,545 having a 100% reflectance to infrared energy in the wavelength of 2.3 microns to 25 microns. Coatings having a 65% reflectance to infrared energy have been found to be acceptable in the practice of the invention.

During use, the absorber plate absorbs solar and infrared energy to heat the air moving through the compartments 72 and 74. The infrared energy emanating from the upper surface 56 impinges on the intermediate cover plate 14 and is reflected back to the absorber surface 56. The infrared energy emanating from the bottom surface 62 of the absorber plate 44 is reflected toward the infrared reflective coating 82 and is reflected back to the absorber surface 62. In this manner, the infrared energy loss of the absorber plate 44 is minimized and maximum efficiency is provided for heating the air.

Although not limiting to the invention, but recommended to provide a second moisture-impervious seal, a composite strip 84 including a bendable-formable tape 86, e.g., aluminum, having a layer of the adhesive 26 is provided around (1) the peripheral edge portions of the cover plates 12 and 14, spacer assembly 20, absorber frame 46 and reflector plate 18 and (2) the marginal edge portions of the outer cover plate 12 and reflector plate 18.

Mounted on the back side of the reflector plate 18 is an insulating compartment 90 of the type taught in U.S. patent application Ser. No. 550,507 filed on Feb. 18, 1975, now U.S. Pat. No. 3,995,613 in the name of Pandit G. Patil and entitled "Solar Heat Collector Unit." In general, the insulating compartment includes a thermal insulating material 92, e.g., fiber glass, held against surface 94 of the reflector plate 18 by a pan-shaped metal member 96. Flanges 97 of the member 96 are thermally insulated from the reflector plate 18 by a layer of asbestos 98. The member 96 is held against the reflector plate 18 by a U shaped channel member 99.

The channel member 99 also protects the edges of the plates 12, 14 and 18 and provides structural stability to the air heater 10 by urging the plates and absorber toward each other about the spacer frame and adhesive. The inlet and outlet pipes 64 and 66, respectively, extend through and beyond the composite strip and channel member to provide access for moving air and removing heated air from the solar air heater 10. The channel member 99 generally includes several sections of channeling joined and/or abutted together at their ends.

Figure 4:
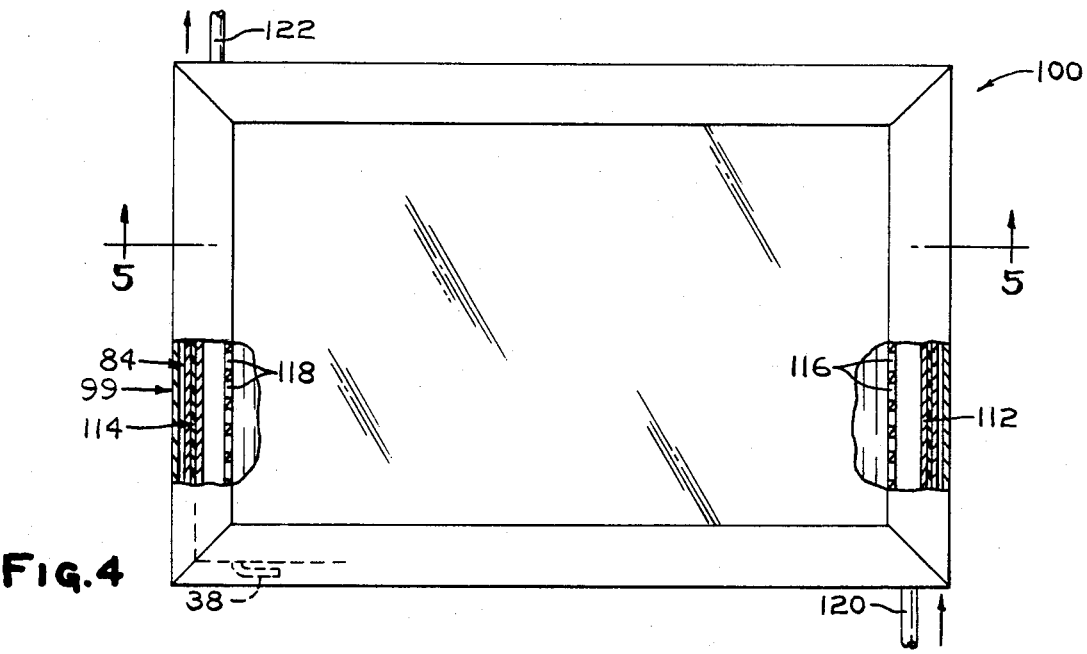
FIG. 4 is a plan view of an alternate embodiment of a solar collector having portions removed for purposes of clarity and incorporating features of the invention.
Figure 5:
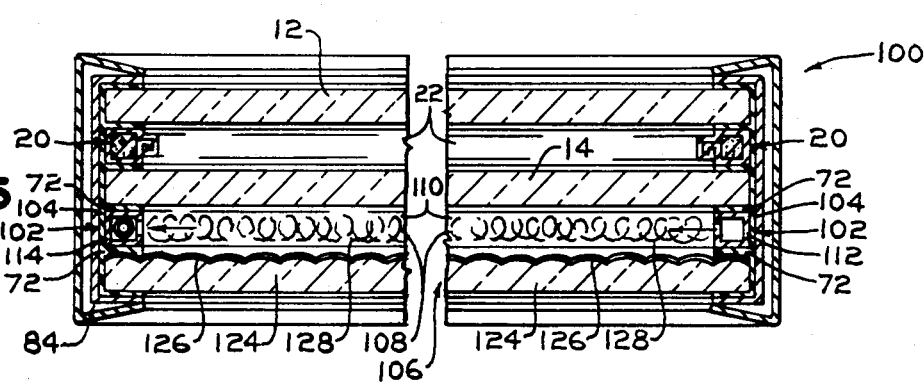
FIG. 5 is a fragmented view taken along lines 5—5 of FIG. 4.

Referring now to FIGS. 4 and 5, the discussion will be directed to a solar collector 100 of the invention for heating a fluid. Although the collector 100 is preferably used to heat air by solar energy, it may be used to heat water. The solar collector 100 includes the outer cover plate 12 and the intermediate cover plate 14 held in spaced relation by the spacer assembly 20 to provide the dead airspace 22 therebetween.

A second spacer assembly 102 includes a spacer frame 104 and the adhesive 72 to maintain the intermediate cover plate 14 in spaced relation to absorber 106 to provide an air heating compartment 108 therebetween. The spacer frame 104 has a first pair of opposed side members 110 (one shown in FIG. 5) joined to a pair of opposed side baffle members 112 and 114. The baffle members 112 and 114 are each provided with a plurality of holes 116 and 118, respectively (shown better in FIG. 4) to pass air through the compartment 108. For example, air is moved through inlet pipe 120 into the baffle member 112 out of the holes 116 through the compartment 108 and into the side baffle member 114 by way of holes 118. The heated air passes out of the baffle member 114 by way of outlet pipe 122.

The holes 116 and 118 increase in size as the distance from the inlet pipe 120 and outlet pipe 122, respectively, increases to provide a uniform flow rate. As can be appreciated, the inlet pipe 120 and outlet pipe 122 may be positioned at any location on the baffle members 122 and 114, respectively.

The absorber plate 106, in general, includes a substrate 124 made of a rigid material such as metal, wood, plastic, or glass having a coating 126 to enhance the absorption of the solar and infrared energy.

The coating 126 may include a coating having a high solar absorption. One such coating is black paint such as the type sold by PPG Industries, Inc., under the trademark DURACRON ® Super 600L/G and fired at a temperature of about 350° F. (177° C.) for 15 to 20 minutes to provide a coating having an absorption coefficient for solar radiation in the wavelength of 0.3 to 2.1 microns and an emissivity coefficient for infrared energy in the wavelength of about 2.1 to 25 microns of about 0.95.

In the alternative the coating 126 may be a composite coating including a coating of high solar absorption over a high infrared reflecting surface, e.g., having at least 65% infrared reflectance. The reflective coating may be silver, gold, tin oxide, indium oxide or a mixture thereof. Preferably the coating is tin oxide or indium oxide applied as taught in the above-mentioned patents because the coating can withstand high temperatures without separating from the substrate 124. For example, a coating of tin oxide or indium oxide having a 65% reflectance to infrared energy may be applied to the surface of the glass substrate 124 followed by a coating of DURACRON ® Super 600L/G applied as discussed above. The advantage of the composite coating is that infrared heat loss is minimized by the reflective coating directing the infrared energy back toward the compartment 108 thereby minimizing heat loss from the back side of the absorber 106.

Further, the composite coating 126 may include a layer of a coating of high solar absorption on the substrate followed by a high infrared reflective coating.

In this instance, the infrared energy is reflected from the infrared reflective coating toward the intermediate cover plate, e.g., a glass sheet. The glass sheet is considered opaque to infrared energy, therefore the compartment contains infrared energy and the air passing therethrough is directly heated. Solar energy in the range of 0.3 to 2.1 microns passes through the reflective coating and is absorbed by the black coating to further heat the air by absorption.

Normally a black coating having an absorptivity of 0.95 to solar energy in the wavelength range of 0.3 to 2.1 microns and a reflective coating having a reflectance of about at least 65% in the infrared range of 2.1 to 25 microns is acceptable in the practice of the invention. A coating of DURACRON ® Super 600L/G may be used for the black coating and tin oxide or indium oxide may be used for the reflective coating.

Although not limiting to the invention, but recommended to expose a larger surface area to the sun, the surface of the substrate 124 is provided with a dimpled or patterned surface, i.e., raised and lowered surface portions. Further, the compartment may be filled with porous material 128, e.g., fiber glass or steel wool coated with black paint to provide turbulance in the air flow pattern thereby enhancing the heat transfer to the air. Preferably the porous material is loosely packed in the compartment 108 so that solar energy is incident on the absorber surface to provide a more uniform temperature gradient in the compartment 108.

In the prior art, e.g., U.S. Pat. No. 3,102,532, sheets of perforated foil are provided in a collector chamber. The drawback is that the sheets of foil lowermost in the stack are not directly heated by solar energy as are the topmost sheets. This condition sets up temperature gradients in the collector chamber that results in the heated air having air masses of different temperatures or heated air having an overall lower temperature than that heated by the solar air heater of the instant invention.

Referring now to FIG. 5, the composite strip 84 and channel member 99 are provided about the solar air heater 100. To prevent heat loss of the absorber to the environment insulating material may be mounted on the outer surface of the absorber 106, e.g., thermal insulating compartment 90 shown in FIG. 2 in a manner taught in the above-mentioned U.S. patent application Ser. No. 550,507.

Figure 6:
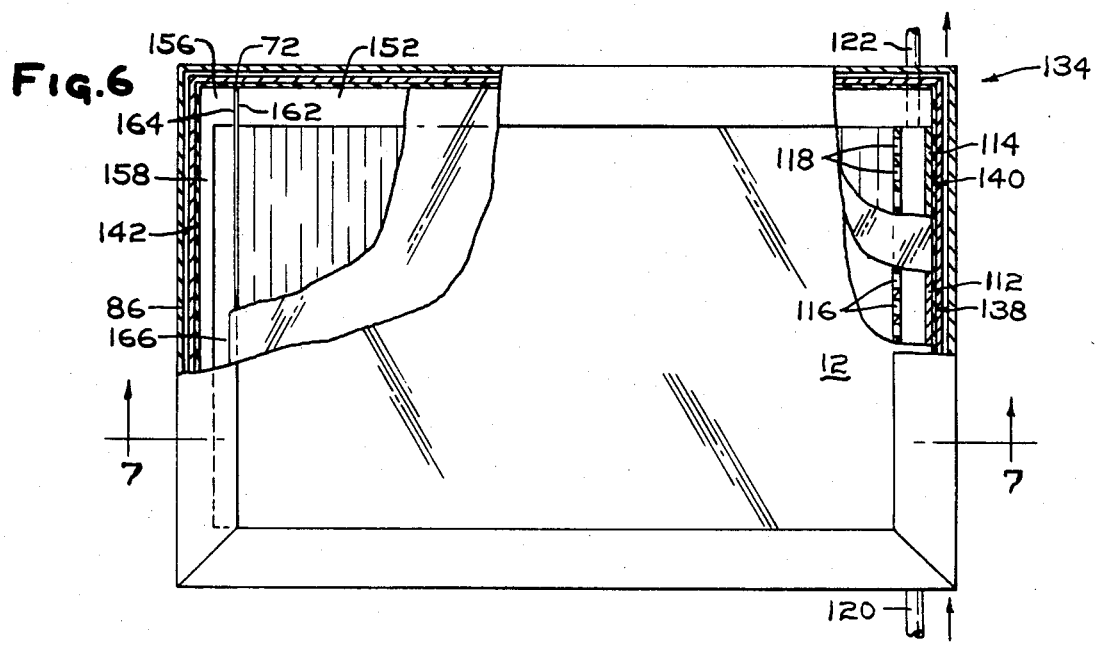
FIG. 6 is a plan view of an alternate embodiment of a solar collector having portions removed for purposes of clarity and incorporating features of the invention.

Referring now to FIGS. 6 and 7, there is shown a solar air collector 134 incorporating features of the invention. The solar air heater 134 is similar to the solar air heater 100 shown in FIGS. 4 and 5 with the differences now to be discussed. The solar air heater 134 includes the outer cover plate 12, an intermediate cover plate 136 and the absorber 106 held in spaced relation by spacer assemblies 138, 140 and 142 to provide interconnecting heating compartments 144 and 146 in a manner discussed below.

The spacer assembly 138 is provided between the outer cover plate 12 and the intermediate cover plate 136 and the spacer assembly 40 is provided between the intermediate cover plate 138 and the absorber 106.

The spacer assemblies 138 and 140 are identical in construction, and therefore the discussion will be directed to the spacer assembly 138 with the understanding that the discussion is applicable to the spacer assembly 140 unless indicated otherwise.

The spacer assembly 138 and 140 each include a U shaped spacer frame 148 and a layer of the adhesive 72 on opposed outer surfaces. The adhesive prevents ambient air from moving into the compartments 144 and 146.

The spacer frame 148 includes a pair of outer legs 152 (one shown in FIG. 7) joined by the side baffle member 112 to provide a generally U shaped spacer frame. The outer legs 152 of the spacer assembly 140 is joined by the side baffle member 114.

The spacer assembly 142 includes outer legs 156 (one shown in FIG. 7) joined by a center leg 158 to provide a generally U shaped frame 160. The frame is adhesively bonded between the absorber 106 and outer cover plate 12 by a layer of adhesive 72 as shown in FIG. 7.

Ends 162 of the outer legs 152 of the spacer frames 148-148 are joined to ends 164 of the outer legs 156 of the spacer frame 160 by the adhesive 72 (see also FIG. 6).

The intermediate cover plate 136 is mounted between the spacer assemblies 138 and 140 and has end 166 spaced from the center leg 158 of the spacer frame 160 to interconnect the heating compartments 144 and 146.

Air is moved into side baffle member 112 of the spacer assembly 138 by way of the inlet pipe 120 and into the compartment 144 through holes 116. The air passes through the compartment 144 around the end 166 of the intermediate cover plate 136 into the compartment 146. The holes 118 of the side baffle member 114 of the spacer assembly 140 passes the air into the side baffle member 114 and out of the baffle member 114 by way of the outlet pipe 122.

The spacing between the end 166 of the intermediate cover plate 136 and central portion 158 of the spacer frame 160 is not limiting to the invention. The spacing, however, should be sufficient to provide equal pressure in the compartments 144 and 146 to prevent movement of the outer cover plate from the intermediate cover plate 136 that could cause a void in the adhesive layer 72.

Although not shown in FIGS. 6 and 7, the porous material 128 shown in FIG. 6 may be provided in the compartment 146 and the thermal insulating compartment 90 shown in FIG. 2 may be provided on the back surface of the absorber plate 106.

The solar collector 134 provides increased efficiency in the use of solar energy and infrared energy to heat air. Solar energy passing through the outer cover plate and infrared energy passing through the intermediate cover plate initially heats the air as it moves through the compartment 144. The air then passes through the compartment 146 where it is further heated by the absorber, infrared energy radiating from the absorber and solar energy passing through the intermediate cover plate. Because the air is preheated in the compartment 144, a large flow of air can be passed through the solar air heater 134 without decreasing the temperature of the air.

The composite strip 86 and U shaped channel member 99 may be provided around the perimeter of the solar air heater 134 as shown in FIGS. 6 and 7.

Referring now to FIGS. 8 and 9, there is shown another embodiment of a solar collector 172 incorporating features of the solar collector 134 shown in FIGS. 6 and 7 and the solar collector 10 shown in FIGS. 1 and 2.

The solar collector 172 includes the outer cover plate 12, intermediate cover plate 136 and spacer assemblies 138 and 142 of the solar air heater 134 shown in FIGS. 6 and 7; an absorber 174; and the infrared reflector plate 18 shown in FIGS. 1 and 2.

The absorber 174 is similar to the absorber 16 shown in FIG. 3 with the difference now to be discussed. The absorber 174 has a baffle member 176 similar to the side baffle 48 but without the inlet pipe 64 thereby providing air communication between the upper surface 56 and the bottom surface 62 of the absorber plate 44 by way of holes 178. Baffle member 180 is similar to the side baffle 50 but has only one series of holes 182 to remove air from the solar air heater by way of outlet pipe 184.

Air passes through the baffle member 112 into compartment 144, around the edge 166 of the intermediate plate 136 and through compartment 188. The air then passes through the baffle 178 to compartment 190 and out of the compartment 190 by way of the baffle 180 and the outlet pipe 184.

The composite strip 84 and U shaped channel 99 are provided about the air heater 172. To reduce heat loss, the thermal insulating compartment 90 may be provided on the back side of the absorber 18 as shown in FIG. 2.

The solar air heater 172 provides a longer air flow path thereby further increasing the efficiency of heating air and can heat larger air flows passing through the air heater.

Figure 10:
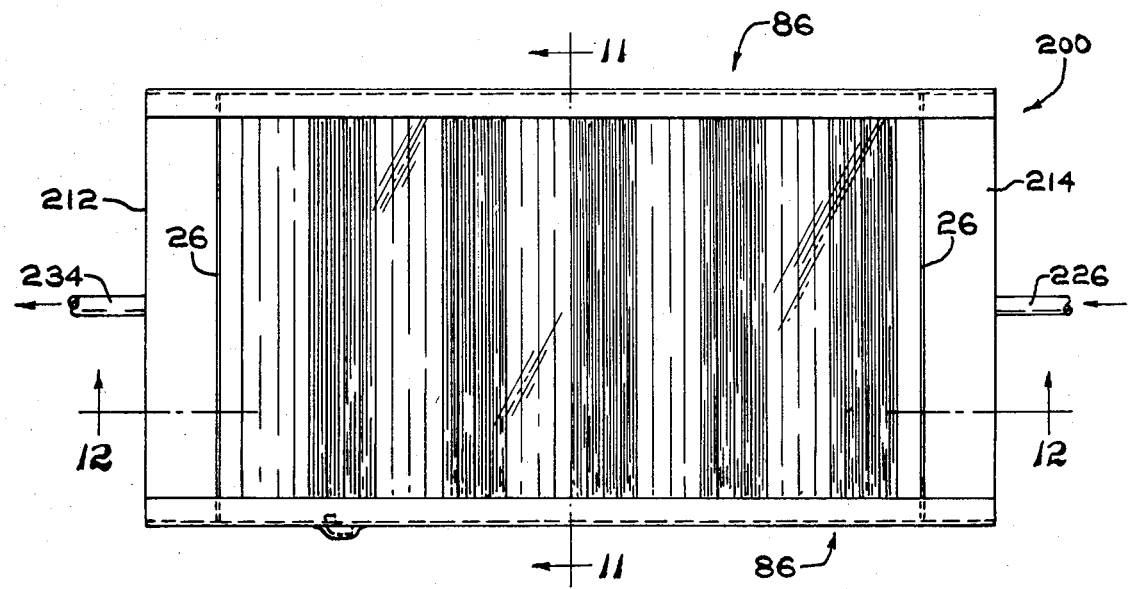
FIG. 10 is a plan view of a solar absorber having a perforated absorber plate to cause turbulance of a fluid passing therethrough.
Figure 11:
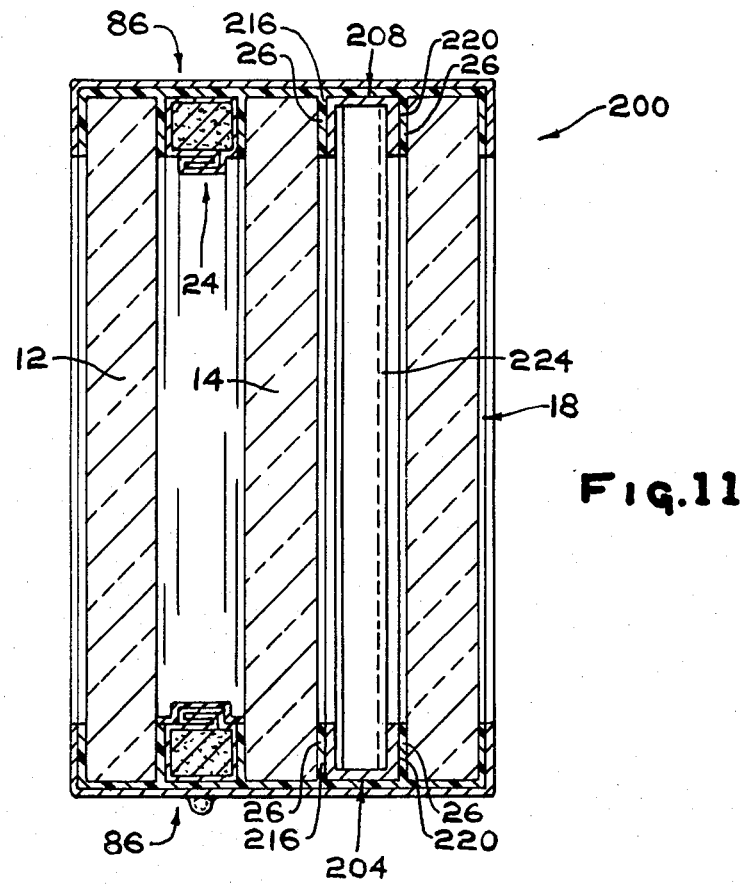
FIG. 11 is a view taken along lines 11—11 of FIG. 10.
Figure 12:
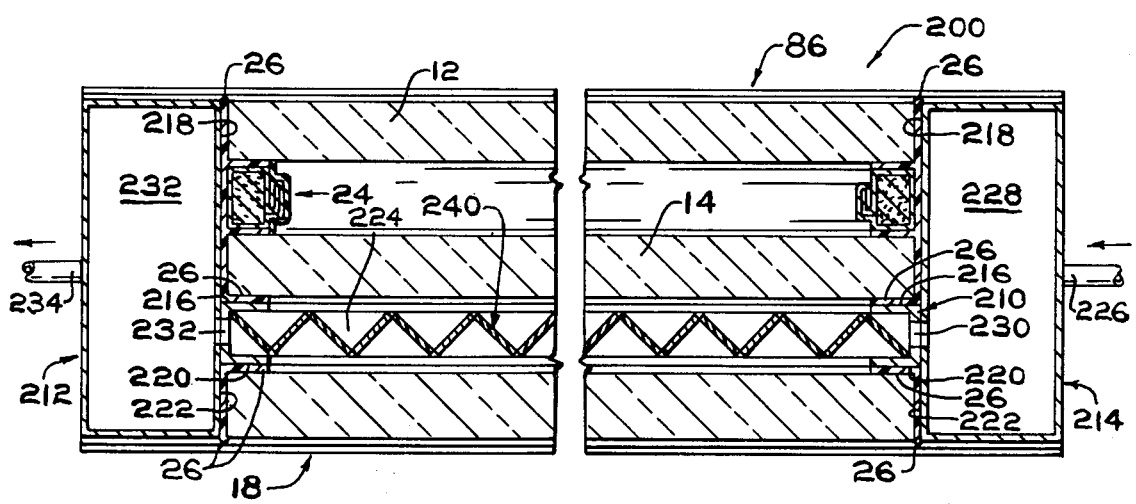
FIG. 12 is a view taken along lines 12—12 of FIG. 10.

Referring to FIGS. 10-12, there is shown solar collector 200 illustrating another embodiment of the invention for heating a fluid. The collector 200 is preferably used for heating air but may be used to heat water by solar and infrared energy.

Figure 13:
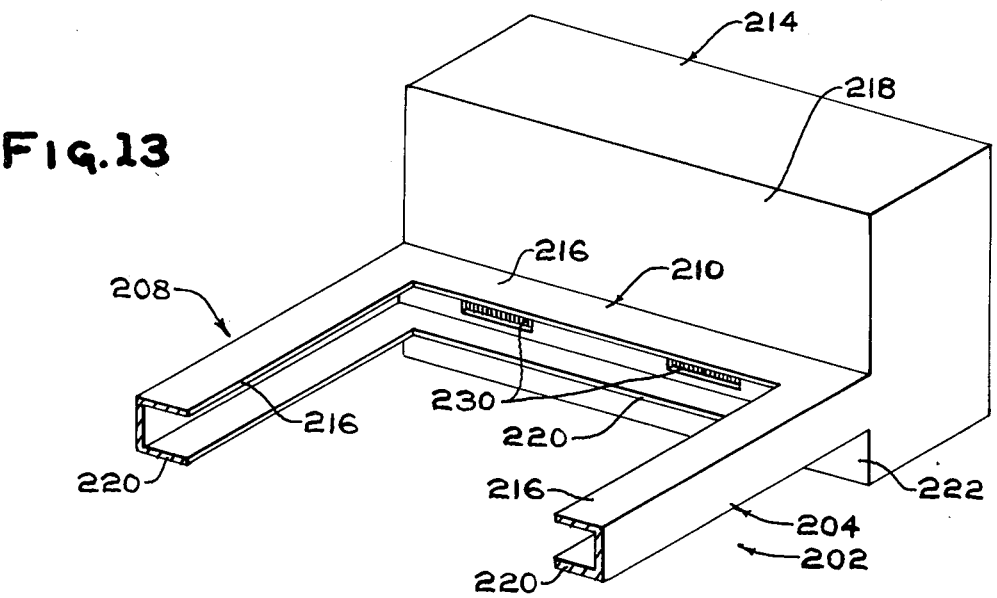
FIG. 13 is a perspective view of the frame of the solar absorber in FIG. 10 having portions removed for purposes of clarity.

With reference also to FIG. 13, the solar collector 200 includes a frame 202 made of "C" shaped sections 204, 206, 208 and 210 and end baffles 212 and 214 at outer surfaces of opposed sections 206 and 210 respectively. Upper surface 216 of the frame 202 and upper wall surface 218 of the baffles 212 and 214 form a ledge and sidewalls for supporting the cover plates 12 and 14 and spacer assembly 24 as shown in FIGS. 11 and 12.

A layer of the adhesive 26 is provided between the upper surface 216 of the frame 202 and adjacent marginal edge portions of the cover plate 14 and opposed surfaces of the spacer assembly 24 and adjacent marginal edge portions of the cover plates 12 and 14. A bead of the adhesive 26 is provided between the baffles and adjacent edges of the glass sheet 12 as shown in FIGS. 10 and 12 and fills voids between wall portion 218 of the baffles 212 and 214 and adjacent edge portions of the glass plates 12 and 14 and spacer assembly 24.

Lower surface 220 of the frame 202 and bottom wall portions 222 form a ledge and sidewalls for receiving the infrared reflector Plate 18. A layer of the adhesive 26 is provided between the frame surface 220 and adjacent marginal edges of the plate 18. A bead of the adhesive 26 is provided between the baffles 212 and 214 and adjacent edges of the plate 18 as shown in FIG. 12 and fills voids between wall portions 222 and adjacent edge portions of the plate 18.

The plates 18 and 14 form a compartment 224 for passing air which is heated by solar energy. With reference to FIG. 12, air is passed into the compartment 224 by way of inlet pipe 226 into air chamber 228, the baffle 214 out of the baffle 214 into the compartment 224 by way of holes 230 through the inner baffle wall and spacer section 210 (see also FIG. 13). The air is moved out of the compartment 224 by way of holes 232 in the inner baffle wall and spacer section 206 into air chamber 232 of the baffle 212 and out of the air chamber 232 by way of outlet pipe 234.

The inside cross sectional areas of the pipes 226 and 234 and combined areas of their respective holes 230 and 232 are preferably equal to eliminate or minimize air pressure drop.

Figure 14:
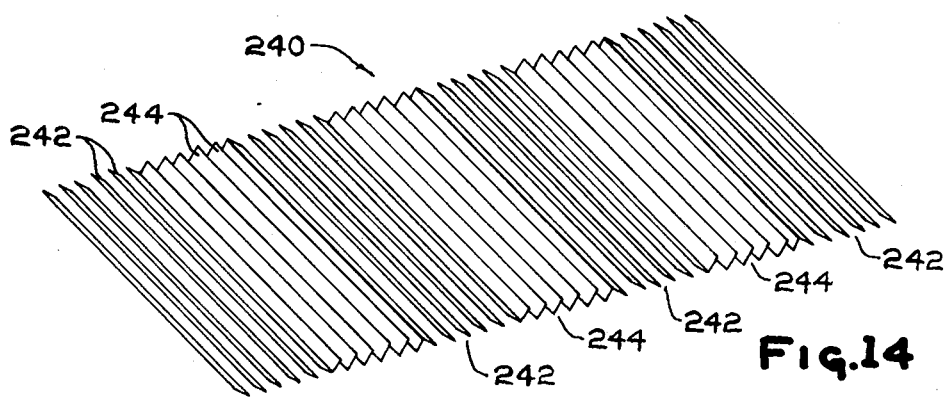
FIG. 14 is a perspective view of the solar absorber used in the solar collector of FIG. 10.
Figure 15:
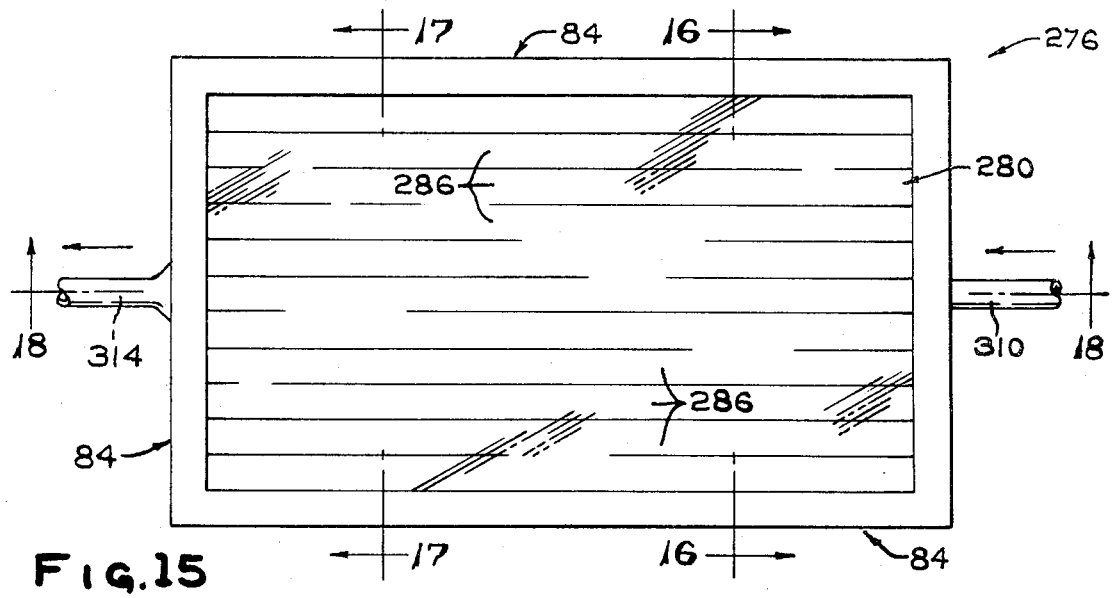
FIG. 15 is a plan view of an alternate embodiment of a solar collector incorporating features of the invention.

Mounted in the compartment 224 in the frame 202 as shown in FIGS. 11 and 12 is solar energy absorber plate 240 shown in FIG. 14. The plate 240 has a first series of holes 242 and second series of holes 244 alternated along its length. The holes 242 are arranged to direct a portion of the air flow in a first direction, e.g., from the upper portion of the chamber 224 to the bottom portion of the chamber 224 and the holes 244 are arranged to direct a portion of the air flow in a second direction opposite to the first direction, e.g, from the bottom portion of the chamber 224 to the upper portion of the chamber 224 as shown in FIG. 12. In this manner, air turbulance is created to more efficiently heat the air by solar energy as it moves through the compartment 224.

A type of absorber that may be used in the practice of the invention is a perforated aluminum plate of the type sold by A. J. Williams Co. of Pittsburgh, Pennsylvania Catalog No. 23.

The surfaces of the plate are treated to provide maximum efficiency in absorbing solar and infrared energy.

Although not limiting to the invention but to provide a second moisture impervious seal, the composite strip 86 is provided on the outer marginal edges of the cover plate 12, infrared reflector plate 18 and opposed peripheral edge of the collector 200 as shown in FIGS. 10, 11 and 12. Further the insulating compartment 90 shown in FIG. 2 may be used.

Shown in FIGS. 15-18 is a solar collector 276 incorporating features of the invention for heating a fluid. The collector 276 is preferably used to heat water but may be used to heat air by solar and infrared energy.

The collector 276 includes a solar energy and infrared absorber plate 278 held in spaced relation to cover plate 280 by a spacer frame 282 to form a heating compartment 283 in a manner to be discussed below.

The absorber plate 278 is similar to the absorber plate 106 shown in FIG. 5 and includes the substrate 124 having a coated patterned surface 284. The coated surface preferably includes a coating of high absorption to solar energy on the substrate followed by a high infrared reflective coating as was discussed for the absorber plate 106 of FIG. 5.

The high infrared reflective coating is preferably selected to also protect the underlying high absorptive coating against alkaline attack of the water. For example, but not limiting thereto, the reflective coating preferably used is a tin oxide coating or indium oxide. The invention also contemplates using (1) a coating having a high solar absorption or a coating having a high infrared reflective on the inner surface of the absorber plate or (2) a coating having a high infrared reflectance on the inner surface and a high solar absorption surface on the outer surface of the absorber plate 278.

Figure 18:
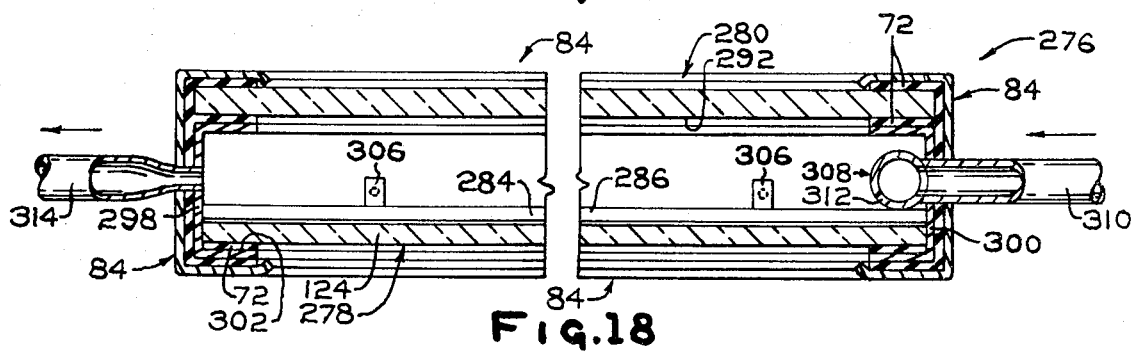
FIG. 18 is a view taken along lines 18—18 of FIG. 15.

The patterned surface 284 of the absorber plate 278 includes a plurality of discrete channels 286 extending from end 288 toward or to the end 290 of the absorber plate as shown in FIG. 18 for defining a water path across surface 284 of the absorber plate 278.

The cover plate 280 is similar to the cover plates 12 or 14 of the solar collector 10 shown in FIG. 2 but preferably has a protective coating 292 on the inner surface that passes solar energy. The protective coating prevents alkaline attack of the glass by the water. The protective coating may be, but is not limited to tin oxide or indium oxide.

Figure 16:
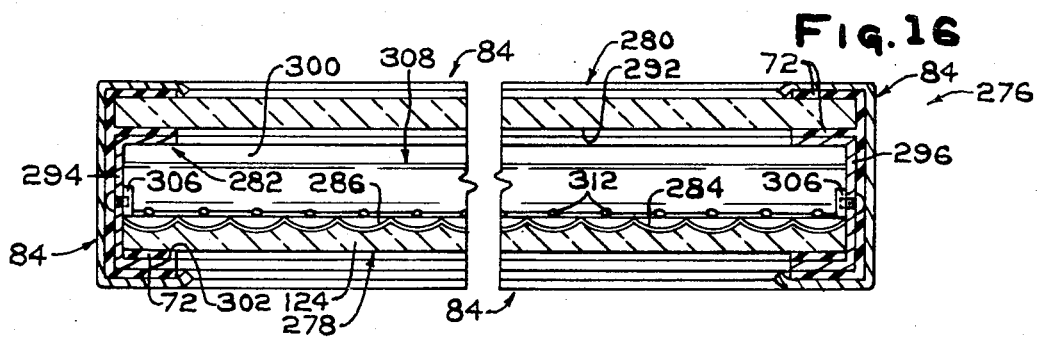
FIG. 16 is a view taken along lines 16—16 of FIG. 15.
Figure 17:
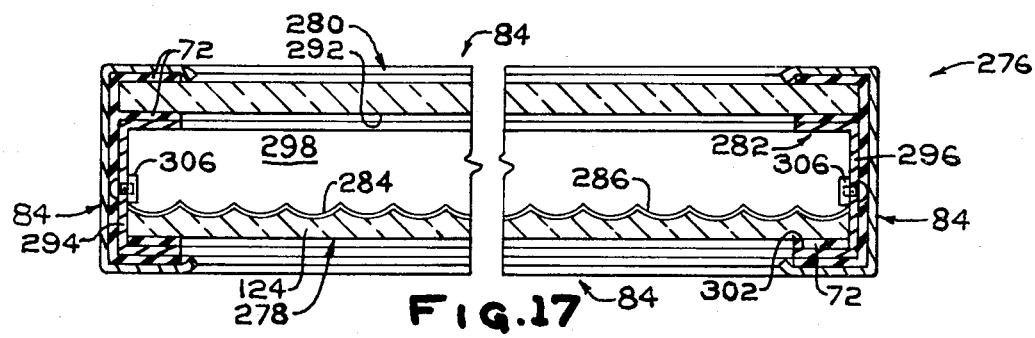
FIG. 17 is a view taken along lines 17—17 of FIG. 15.

The spacer frame includes spacer sections 294, 296, 298 and 300 each made of "C" shaped channel sections having their ends joined together to form the spacer frame 282 having an inner edge 302 for supporting the absorber plate 278 and an outer ledge 304 for supporting the cover plate 280 as shown in FIGS. 16-18.

The sealant 72 is provided between the ledge 302 and adjacent marginal edges of the absorber plate 278 and between the ledge 304 and adjacent marginal edges of cover plate 280 to seal the compartment 283 to prevent water from uncontrollably escaping from the compartment 283. The sealant may be a silicon adhesive.

Tabs 306 are provided to maintain the absorber plate 278 on the ledge 302 of the spacer frame 282.

The tabs are held in position in the spacer frame and against the inner marginal edges of the absorber plate in any conventional manner, e.g., by screws.

With specific reference to FIG. 18, a baffle member 308 is mounted in the section 300 of the spacer frame 282 and has a pipe 310, e.g., an inlet pipe, extending through the wall of the spacer section 300 to provide external access to the baffle member 308 for moving water therethrough.

The baffle member includes a plurality of holes 312 ones of which are aligned with ones of the channel 286 of the absorber plate 279 for directing a stream of water into each of the channels 286.

The holes 312 preferably increase in diameter as the distance from the inlet pipe 310 increases to provide for a generally uniform flow rate through each of the holes 312 of the baffle member 308.

The opposed spacer section 298 is provided with a pipe 314 e.g., an outlet pipe communicating with the compartment 283 to move the water heated by solar and infrared energy out of the compartment 283 for subsequent use.

The pipes 310 and 314 are preferably sealed to their respective spacer section to prevent leakage of water.

Although not required to practice the invention, but recommended to further seal the compartment 283, the composite strip 84 is provided around the periphery of the spacer frame 282, cover plate 280 and absorber 278 and extended over the outer marginal edge of the cover plate 280 and absorber plate 278 as shown in FIGS. 15-18.

In practice, the collector 276 is mounted in a tilted position with the side having the baffle member 308 in the uppermost position to flow water by gravity along the channels 286 into the spacer section 298 and out of the compartment 283 by way of outlet pipe 314.

Controlling the flow rate of the water in the channels of the absorber plate controls the differential temperature of the water, i.e., the difference of the inlet temperature of the water and the outlet temperature of the water.

For example, for a given insolation and ambient temperature, increasing the water flow decreases the differential water temperature and visa versa. As can now be appreciated, the invention is not limited to the flow rate of the water moving in the channels.

The collector 276 shown in FIGS. 15-18 may be used to heat swimming pool water by passing the water from the pool through the collector 276 back into the pool. The chemicals in the pool water do not attack the cover plate or absorber plate when they are coated as previously discussed.

As can be appreciated, the solar collectors 10, 100, 134, 172, 200 and 276 are not limiting to the invention and other embodiments can be made in accordance to the teachings of the invention. Further elements of the solar air heaters 10, 100, 134, 172, 200 and 276 may be interchanged without deviating from the scope of the invention.

DETAILED DESCRIPTION OF THE INVENTION

The invention will now be described to construct the solar collectors in accordance to the teachings of the invention. In the following discussion, like numerals refer to like elements.

Referring to FIG. 3, an absorber 16 is provided having a corrugated 0.030 inch (0.070 centimeter) thick steel absorber plate 44 supported within a steel frame 46. The frame includes opposed sides 192 about 75 inches (190 centimeters) long × 5/16 inch (0.85 centimeter) high and ½ inch (1.74 centimeters) wide joined to side baffles 48 and 50. The side baffles are each about 34 inches (86 centimeters) long, 5/16 inch (0.85 centimeter) high and ¾ inch (190 centimeters) wide. An inlet pipe 64 is provided at a side of the side baffle 48 and outlet pipe 66 is provided at a side of the side baffle 50. A series of holes 52 and 64 are provided in the side baffles 48 and 50, respectively, above the upper surface 56 of the absorber plate 44 and a series of holes 58 and 60 are provided in the side baffle 48 and 50, respectively, adjacent the surface 62 of the absorber plate 44. Each of the pipes 64 and 66 are about 3 inches (7.6 centimeters) long and have a wall thickness of about 0.025 inch (0.64 centimeter) and an inside diameter of ½ inch (1.77 centimeters). The holes adjacent the pipes 64 and 66 have a diameter of about 1/32 inch (0.08 centimeter) and the holes spaced farthermost from the ends have a diameter of about 3/16 inch (0.50 centimeter) with incremental increase of about 0.005 inch (0.013 centimeter).

The surfaces 56 and 62 of the absorber plate 44 are provided with a layer of black paint such as the type sold by PPG Industries, Inc., under the trademark DURACRON ® Super 600L/G and fired at a temperature of about 350° F. (177° C.) for 15 to 20 minutes to provide the absorber with surfaces having an absorptivity coefficient for solar radiation in a wavelength of 0.3 to 2.1 microns and an emissivity coefficient for infrared energy in the wavelength of 2.1 to 25 microns of about 0.95.

The frame 46 of the absorber 18 is adhesively bonded to an infrared reflector plate by adhesive 72 provided between the frame 46 of the absorber 16 and marginal edge portions of the reflector plate 18.

The adhesive may be of the type disclosed in the above-mentioned U.S. patent applications Ser. Nos. 450,703, and 550,679.

The reflector plate 18 includes a tempered glass sheet 80 about 34 inches (86 centimeters) by 76 inches (193 centimeters) and ⅛ inch (0.32 centimeter) thick, having a coating 82 of tin oxide such as the type sold under the trademark NESA ® owned by PPG Industries, Inc., and taught in U.S. Pat. Nos. 2,566,346; 3,107,177 and 3,677,814. The coating has a resistance of 15–20 ohms per square and a reflectance to infrared energy in the wavelength range of 2.1 to 25 microns of about 0.65.

Sections of lock seam spacers of the type taught in U.S. Pat. No. 2,684,266 are joined together to provide a spacer frame 24 about 34 inches (86 centimeters) by 76 inches (193 centimeters) and 5/16 inch (0.85 centimeter) high of the type disclosed in the above-mentioned U.S. patent application Ser. No. 550,680. The spacer frame 24 is provided with a desiccant material 30 and a breather tube 38 to absorb moisture from the dead airspace 22 and to equalize pressure in the airspace 22 with ambient air pressure.

A pair of clear tempered glass sheets 12 and 14 each having dimensions of about 34 inches (86 centimeters) by 76 inches (193 centimeters) by ⅛ inch (0.32 centimeter) thick are cleaned in any conventional manner to remove foreign particles that may inhibit the passage of solar radiation through the glass sheets toward the absorber.

A layer of adhesive 72 is provided between the marginal edge portions of the glass sheet, i.e., intermediate cover plate 14 and the frame 46 of the absorber 18. The spacer frame 24 is provided on opposed outer surfaces with a layer of moisture-resistant adhesive 26 of the type disclosed in the above-mentioned U.S. patent application Ser. No. 550,679 to provide a spacer assembly 20. The spacer assembly 20 is positioned on the glass sheet 14 with the glass sheet 12 positioned on the spacer assembly 20 to provide the dead airspace 22.

The adhesives 26 and 72 are flowed in any conventional manner to provide the solar air heater 10.

A composite strip 84 including a 1¾ inch (4.4 centimeters) wide aluminum tape 86 having a thickness of 0.010 inch (0.3 centimeter) and the adhesive 26 on one surface is applied in any conventional manner to the solar air heater. Preferably, the composite strip is applied (1) to the peripheral edge portions of the absorber frame 46, glass sheets 12 and 14 and reflector plate 18 and (2) bent over the marginal edge portions of the glass sheet 12 and reflector plate 18. The breather tube 38 is bent toward the composite strip 84.

A thermal insulating compartment 90 including a metal pan 96 and fiber glass 92 is positioned against the surface 94 of the reflector plate. The thermal insulating compartment is of the type taught in the above-mentioned U.S. patent application Ser. No. 550,507.

A channel member 99 of essentially U shaped cross-section is provided completely around the perimeter of the collector to maintain the thermal insulating compartment 90 against the surface 94 of the reflector plate 18. The channel member 99 also protects the glass sheets and provides stability to the solar air heater by urging the glass sheets, spacer assembly, absorber frame and reflector plate 18 toward each other.

As can be appreciated, the inlet and outlet tubes 64 and 66, respectively, extend through the composite strip 84 and channel member 99 to pass air through the air heater.

In use, air is continuously moved through heating compartments 70 and 74. When the solar energy is incident on the absorber, the absorber is heated and air moving over the surfaces of the absorber is heated by convection.

The collector shown in FIGS. 1 and 2 reduces infrared heat loss because the infrared energy emanating from the surface 62 of the absorber plate 44 is reflected back to the absorber surface by the reflector plate 18. Further, the solar collector is efficient for heating air because air moves across the upper and lower surfaces 56 and 62, respectively, of the absorber plate 68 thereby utilizing heat from both of the absorber surfaces.

A solar collector similar to the solar collector 10 having dimensions of 2 feet (61 centimeters) by 3 feet (92 centimeters) was field tested. The ambient air was about 70° F. (21° C.) and the solar insolation was 320 BTU/hr/ft². Air was moved through the compartments 70 and 72 at about 1.5 SCFM (24 cubic centimeters per minute). The temperature of the air at the inlet tube was about 98° F. (39° C.) and the temperature of the air at the outlet tube 66 was 233° F. (112° C.).

Referring now to FIGS. 4 and 5, the discussion will be directed to the fabrication of solar collector 100. A tempered glass sheet 124 about 34 inches (86 centimeters) by 76 inches (193 centimeters) by ⅛ inch (0.32 centimeter) thick and having a patterned surface is provided with a composite coating 126. The composite coating 126 includes a tin oxide coating such as the type previously discussed having a resistance of 15 to 20 ohms per sqare and a reflectance of about 65% to infrared energy in the wavelength of 2.1 to 25 microns. A coating of DURACRON ® Super 600L/G is provided on the tin oxide coating and fired at 350° F. (177° C.) for 15 to 20 minutes to provide the absorber with a top surface having an absorptivity coefficient for solar radiation in the wavelength of 0.3 to 2.1 microns of about 0.95 and an emissivity coefficient for infrared energy in the wavelength of 2 to 20 microns of about 0.65.

A pair of opposed side members 110 (one shown in FIG. 5) are joined to a pair of side baffle members 112 and 114 to provide a spacer frame 102 having dimensions of about 34 inches (86 centimeters) by 76 inches (193 centimeters) and ¾ inch (1.90 centimeters) high. An inlet pipe 120 provides communication to the interior of the side baffle members 114. The holes 116 and 118 closest to their respective pipes have an opening of ⅛ inch (0.32 centimeter) diameter and the holes farthermost from their respective pipe have an opening of ⅜ inch (0.95 centimeter) diameter with adjacent holes having an incremental difference of about 0.025 inch (0.06 centimeter).

The adhesive 72 is provided between the spacer frame 104 and marginal edge portions of the absorber 106. Steel wool 128 coated with black paint is provided within the spacer frame 104. The adhesive 72 is also provided between the glass sheet 14 and the spacer frame 104 to provide a heating compartment 108. The spacer assembly 20 and glass sheet 12 are positioned on the glass sheet 14 as previously discussed.

The adhesives 27 and 72 are flowed in any conventional manner to provide the solar air heater 100 having a dead airspace 22 and the heating compartment 108.

The composite strip 84 and U shaped channel 99 are applied as previously discussed.

In use, air is continuously moved through the heating compartment 108. When solar energy is incident on the absorber 106, the absorber is heated by solar and infrared energy to heat the air passing through the compartment 108 by convection.

The solar collector shown in FIGS. 4 and 5 efficiently heat the air because the air as it passes through the steel wool is mixed which increases its heat absorption. Further infrared heat loss from the back of the absorber is reduced because the infrared reflector coating reflects the infrared energy back toward the black coating instead of permitting it to pass through the glass substrate 124.

A solar collector similar in construction to the solar collector 100 was field tested. The solar collector tested did not have the steel wool 128 in the air heating compartment 108 and was provided with a thermal insulating compartment similar to the thermal insulating compartment 90 shown in FIG. 2. The solar collector tested had dimensions of about 2 feet (61 centimeters) by 3 feet (92 centimeters). The ambient air was 77° F. (25° C.) and the solar insolation was 312.2 BTU/hr/ft². Air was moved through the compartment 108 at a flow rate of 160 SFCH. The temperature of the air at the inlet tube 120 was about 106° F. (42° C.) and at the temperature of the air at the outlet tube 122 was about 219° F. (177° C.).

Referring now to FIGS. 6 and 7, the discussion will be directed to the construction of solar collector 134.

A U shaped spacer 142 made of aluminum is mounted on the adhesive 72 provided on the marginal edge portion of the surface of the absorber 106. The spacer 142 has a height of about 1 1/4 inches (3.18 centimeters) and a width of 5/16 inch (0.80 centimeter). Each of the outer legs 156 of the spacer 142 have a length of about ¾ inch (1.90 centimeters) and the center leg 158 has a length of 34 inches (86 centimeters).

A U shaped spacer frame 140 is positioned on the adhesive with ends 162 of the outer legs 152 (one shown) adhered to adjacent ends 164 of the outer legs 156 of the spacer frame 160 by adhesive 72. The spacer frame 140 has a height of about ½ inch (1.77 centimeters) and a width of about 5/16 inch (0.80 centimeter). The side baffle member 114 is provided between the legs 152 of the spacer frame 140 for removing heated air from heating compartments 146.

A glass sheet 136 similar to the glass sheet 14 shown in FIG. 5 having dimensions of about 34 inches (86 centimeters) by 75.5 inches (1.91 centimeters) and 1/7 inch (0.32 centimeter) thick is positioned on a layer of the adhesive 72 provided on outer surface of the spacer frame 140. End 166 of the glass sheet 136 is spaced about ½ inch (1.77 centimeters) from the center leg 158 of the spacer frame 160.

A spacer frame 138 similar to the spacer frame 140 and having adhesive 72 on opposed outer surfaces and end 162 of the outer legs 152 is positioned on the glass sheet 136. The glass sheet 12 is positioned on the adhesive 72 of the spacer frames 138 and 142 to provide a heating compartment 144 interconnected to the heating compartment 146.

The adhesive 72 is then flowed to prevent ambient air from moving into the heating compartments of the solar air heater. The composite strip 86 and U shaped channel member 99 are then applied to the perimeter of the air heater as previously discussed.

In use, air is moved through the inlet tube 120 into the side baffle member 112 of the spacer frame 138 through the heating compartment 144, around the edge 166 of the glass plate 136, through the heating compartment 146 and out of the solar air heater 134 by way of the side baffle member 114 and outlet tube 122.

The solar collector 134 provides efficient heating of the air because the air is heated by solar and infrared radiation as it passes through the heating compartment 144 and thereafter further heated by solar radiation, infrared radiation, and heat convection from the absorber as it passes through the heating compartment 146.

The discussion will now be directed to the construction of solar collector 172 shown in FIGS. 8 and 9.

An absorber 174 is provided similar to the absorber 16 of FIG. 3 with the differences now to be discussed. The differences are (1) the inlet tube 64 is removed from the side baffle 42 to provide a baffle member 176 that provides air communication between the upper and lower surfaces of absorber by way of holes 178 and (2) the holes 54 of the side baffle 50 are eliminated to provide a side baffle member 180 having a series of holes 182. In this manner, air is moved over the upper surface 56 and then the lower surface 62 of the absorber 44.

The absorber 174 is positioned on the adhesive 72 provided on the marginal edge portions of the reflector plate 18. The U shaped member 142 having a height of about 1 inch (2.54 centimeters) and the glass sheet 136 are positioned on the adhesive 72 provided on the upper surface of the absorber frame. Thereafter the spacer frame 138 and outer glass sheet 12 are positioned on the glass sheet 136 as previously discussed. The adhesive 72 is then flowed in any conventional manner to provide the solar collector 172.

Thereafter, the composite strip 86 and U shaped channel member 99 are applied to the solar air heater as previously discussed with the inlet tube and outlet tube extending beyond the channel member.

In use, air is moved into the compartment 144 by way of inlet tube 120 and baffle member 112 of the spacer frame 148. The air moves around the intermediate cover plate through heating compartment 188 and into baffle member 178. Thereafter the air moves out of the baffle member by way of the holes 178 into heating compartment 190 and out of the solar air heater by way of the baffle member 180 and outlet tube 184.

When the absorber is heated by solar energy, the air passing through the compartment 144 is heated by solar energy and infrared energy. The air passing through the compartment 188 is heated by solar energy, infrared energy and heat extracted from the absorber and air passing through the compartment 190 is further heated by infrared energy and heat extracted from the absorber surface.

The solar collector 172 further optimizes heating of the air because the air passes through three compartments of increasing temperature.

The discussion will now be directed to the fabrication of solar collector 200. Referring to FIG. 13, a frame 202 having a width of about 34 inches (0.8 meters), a length of about 76 inches (1.9 meters) and a height of about ⅝ inch (1.6 centimeters) is made of "C" shaped spacer sections 204, 206, 208 and 210 having a wall thickness of about ⅛ inch (0.32 centimeter). A pair of baffles about 34 inches (0.8 meter) in length, about 1⅝ inch (4.1 centimeters) high and about 1⅝ inch (4.1 centimeters) wide are secured to the frame spaced about 76 inches (1.9 meters) apart. As can be appreciated, sections 206 and 210 and their respective baffles 212 and 214 may be extruded as one piece.

An inlet pipe 226 having an ID of about 1⅛ inch (2.22 centimeters) is mounted through outer wall of the baffle 214 and an outlet pipe 234 of similar dimensions is mounted through the outside wall of the baffle 212. A pair of holes 230 each having an opening of about 3½ square inches (22 square centimeters) extend through the inner wall of the baffles 212 and 214 and adjacent wall of the frame sections 206 and 210, respectively.

A perforated aluminum sheet about 75⅝ inches (1.9 meters) in length and about 33⅝ inches (0.8 meter) wide of the type sold by A. J. Williams Co. of Pittsburgh, Pennsylvania, Catalog No. 23 having a fired coating of DURACRON ® Super 600L/G on exposed surfaces is mounted in the frame 202.

The absorber surfaces have an absorptivity coefficient for solar radiation in a wavelength of 0.3 to 2.1 microns and an emissivity coefficient for infrared energy in the wavelength of 2.1 to 25 microns of about 0.95.

The plate 18 is adhesively bonded to bottom surface 220 of the frame 202 by a layer of the adhesive 26. The cover plates 14 and 18 and spacer assembly 24 is mounted on the upper surface 216 of the frame 202 and adhesively bonded thereto by a layer of the adhesives 26 between the upper frame surface 216 and adjacent surface of the cover plate 18. A bead of the adhesive 26 is provided between the baffles 212 and 214 and adjacent edges of the cover plate 12 and reflector plate 18.

The composite strip 86 is provided on opposed lengthwise edge portions of the collector 200 and extends over the outer marginal edge portions of the cover plate 12 and reflector plate 18 as shown in FIGS. 10, 11 and 12.

With reference to FIG. 12, air is moved into compartment 224 by way of inlet pipe 226, air chamber 228 of the baffle 214 and holes 230. The air moves about the absorber and holes 242 and 244 in the absorber (see FIG. 14) change flow direction of a portion of the air flow about every 6 inches (15.2 centimeters). For example, a portion of the air in the upper portion of the compartment 224 flows through the absorber by way of holes 242 to the bottom portion of the compartment 224 and thereafter a portion of the air flows from the bottom portion of the compartment to the upper portion of the compartment 224 as viewed in FIG. 12 by way of holes 244. The air exits the compartment 224 by way of holes 234, air chamber 232 of the baffle 212 and outlet pipe 234.

The solar collector 200 optimizes heating of air because the changing of air flow patterns causes turbulence to better extract heat from the solar heat absorber.

A solar collector similar in construction to the solar collector 200 was compared to a solar collector similar in construction to the solar collector 200 but not having the absorber 240. Each of the collectors were provided with insulation compartment 90 shown in FIG. 1. The comparison was made at Fort Lauderdale, Fla.

The average insolation for a time period between 10:15 a.m. and 3:05 p.m. was 282.53 BTU/hr/ft$^2$ and the ambient temperature was between 63° F.–74° F. (19° C.–25° C.).

The heat transfer coefficient, i.e., the rate at which heat is taken by the air from the compartment 224 for the solar collector 200 was 4.85 BTU/hr/ft$^2$/°F. The efficiency, i.e., the average heat collected divided by the average insulation is determined to be 50.89%.

The heat transfer coefficient for the collector without the absorber 240 was 1.9 BTU/hr/ft$^2$/°F. The efficiency is determined to be 21.91%.

It is considered that the solar collector 200 outperformed the collector without the absorber 240 because of the air turbulence caused by the absorber 240.

The discussion will now be directed to the construction of solar collector 276 shown in FIGS. 15–18.

A 76 inch (193 centimeter) by 34 inch (86 centimeter) tempered glass substrate 124 having a thickness of about 3/16 inch (0.48 centimeter) is provided with 33 channels 286 each 76 inches (193 centimeters) in length and 1 inch (2.54 centimeters) in width and a radius of about 8 inches (20.32 centimeters).

The channeled surface of the substrate 124 is provided with a composite coating 284. The composite coating 284 includes coating a DURACRON ® Super 600L/G on the channeled surface of the substrate 124 followed by a tin oxide coating having a resistance of 25 to 35 ohms per square applied in any conventional manner to provide absorber plate 278.

A spacer frame 282 is made of "C" shaped sections 294, 296, 298 and 300 each having wall thickness of about 1/16 inch (0.16 centimeter) and outside height of about 1 inch (2.54 centimeters) and a width of about ⅝ inch (1.6 centimeters). The end of the spacer sections are welded together to provide a spacer frame having outside dimensions of about 76 inches (193 centimeters) by 34 inches (86 centimeters) and a 1 inch (2.54 centimeter) height.

Inner ledge 302 of the spacer frame has a bead 72 of silicone adhesive thereon onto which is positioned the absorber plate 278. The adhesive 72 is flowed in any conventional manner between the ledge 72 and adjacent marginal edge portions of the absorber plate 278 to form a water tight seal.

Clips 306 are secured on opposed longitudinal spacer sections, e.g., sections 294 and 296 shown in FIGS. 16 and 17 to maintain the absorber plate 278 against the inner ledge 302 of the spacer frame 282.

A baffle member 308 is mounted in the spacer section 300 as shown in FIG. 18. The baffle member 308 is a pipe 309 having its opposed ends sealed or closed in any conventional manner and an inlet pipe 310 extending therefrom having its centerline equally spaced from the ends of the pipe 309. The inlet pipe 310 extends through the wall of the spacer section 300 and is welded thereto.

The pipes 309 and 310 each have a wall thickness of about 3/32 inch (0.24 centimeters) and an outside diameter of about 0.625 inch (1.6 centimeters). The pipe 309 has a length of about 33 inches (84 centimeters) and has 15 holes 312 on a center-to-center spacing of about 1 inch (2.54 centimeters) on each side of the center line of the inlet pipe 310 to align a one of the holes 310 with a one of the channels 286 of the absorber plate 278. The first 3 holes on each side of the center line of the inlet pipe having a diameter of 0.109 inch (0.277 centimeter) and the remaining holes 310 have a diameter of about 0.125 inch (0.32 centimeter).

The spacer section 298 opposite to the baffle member 308 is provided with a centrally located outlet pipe 314. The outlet pipe has a wall thickness of about 3/32 inch (0.24 centimeter) and a diameter of about 1.125 inches (2.80 centimeters). The end of the outlet pipe 314 secured to the spacer frame 294 is squeezed to about a ¾ inch (1.92 centimeter) oblong shape.

A tempered glass plate having a length of about 76 inches (193 centimeters), a width of 34 inches (86 centimeters) and a thickness of about ⅛ inch (0.32 centimeters) is coated with tin oxide coating 292 in any conventional manner to provide cover plate 280. The tin oxide coating has a resistance of about 250-350 ohm/square.

The cover plate 280 is secured to upper ledge 304 of the spacer frame 282 by a bead 72 of silicon adhesive with the coated surface 292 of the cover plate facing the absorber plate 278.

The composite strip 84 is applied to the peripheral edges of the spacer frame 282 and cover plate 280 and on the marginal edge of the cover plate 280 and spacer frame as previously discussed.

The collector 276 is mounted at a 45° angle with the end of the collector having the baffle member 308 at the uppermost position.

Water at the rate of about 3 gallons per minute is moved into the outlet pipe 310. As the water flows in the channels, it is heated by solar and infrared energy and by the heat of the absorber plate, i.e., by conduction.

A solar collector similar in construction to the solar collector 276 was field tested. The solar collector had the insulation compartment 90 shown in FIG. 2 mounted on the outer absorber surface. The ambient air was 50° F. (10° C.) and the solar insulation was 250 BTU/hr/ft$^2$. Water was moved through the inlet pipe 310 at a flow rate of 3 gallons per minute (G.P.M.). The temperature of the water at the inlet pipe 310 was about 72° F. (22° C.) and the temperature of the water at the outlet tube 314 was about 74° F. (23° C.).

As can now be appreciated, the solar collectors discussed above are merely illustrative of solar collectors that may be fabricated in accordance to the teachings of the invention and are not limiting to the invention.

What is claimed is:

1. A solar air heater, comprising:
   a first glass sheet;
   a second glass sheet;
   a spacer assembly mounted between said first and second glass sheets to provide a dead airspace therebetween, said spacer assembly comprising:
      a spacer frame having a breather tube to equalize the air pressure in the dead airspace to ambient air pressure while preventing moisture from moving into the dead airspace; and
      a layer of moisture-impervious adhesive on opposed outer surfaces of said spacer frame to prevent the ingress of moisture into the dead airspace;
   a solar energy absorber comprising:
      a pair of side members;
      a pair of baffles mounted between said pair of side members to provide a frame;
      an inlet pipe connected to one of said pairs of baffles;
      an outlet pipe connected to the other one of said pair of baffles;
      a corrugated substrate having solar and infrared energy absorbing surfaces mounted within the frame;
      a first series of holes in each of said pair of baffles to pass air across the surface of said substrate; and
      a second series of holes in each of said pair of baffles to pass air across the bottom surface of the absorber wherein said first and second series of holes have increased openings as the distance from their respective pipes increases;
   a glass plate having an infrared reflective coating on a major surface; and
   adhesive for joining said second glass sheet to one side of said frame and said glass plate to the other side of said frame.

2. The solar air heater as set forth in claim 1 wherein the reflective coating on said glass plate is tin oxide.

3. The solar air heater as set forth in claim 1 wherein the reflective coating on said glass plate is indium oxide.

4. The solar air heater as set forth in claim 1 further including:
   a composite strip comprising a bendable-formable tape having a layer of adhesive on a surface, and said strip applied to at least the peripheral edges of the solar air heater; and
   a U shaped channel member mounted about the perimeter of the solar air heater having one outer leg mounting the marginal edges of said first glass sheet and the outer leg mounting the marginal edges of said glass plate.

5. The solar air heater as set forth in claim 2 further including:
   thermal insulating material mounted on the outer surface of said glass plate.

6. A solar energy absorber, comprising: a pair of side members;
   a pair of baffles mounted relative to said pair of side members to provide a frame;
   an inlet pipe connected to one of said baffles;
   an outlet pipe connected to the other one of said baffles;
   a solar energy absorber plate mounted within said frame, said plate having a pair of opposed major surfaces with a plurality of channels formed in each of said surfaces;
   a first cover plate capable of passing solar energy;
   a second cover plate having an infrared reflective coating on a major surface
   means for securing said first cover plate in spaced relation to one of said channeled surfaces of said absorber plate to form a first enclosure and to prevent uncontrolled entry of fluid into said first enclosure;
   means for securing said second cover plate in spaced relation to the other of said channeled surfaces of said absorber plate to form a second enclosure and to prevent uncontrolled entry of fluid into said second enclosure;
   a first series of holes in each of said pair of baffles to pass fluid at a uniform rate through selected channels of a selected enclosure; and
   a second series of holes in each of said baffles to pass fluid at a uniform rate through selected channels of the other enclosure, wherein said first and second series of holes have increased openings as the distance from their respective pipe increases.

7. The solar energy absorber as set forth in claim 6 wherein said cover plates are glass.

8. The solar energy absorber as set forth in claim 7, wherein the infrared reflective coating is tin oxide.

9. The solar energy absorber as set forth in claim 7, wherein the infrared reflective coating is indium oxide.

* * * * *